United States Patent
Kowalczyk et al.

(10) Patent No.: US 8,023,793 B2
(45) Date of Patent: Sep. 20, 2011

(54) GROUNDING DEVICE FOR ARMORED CABLE

(75) Inventors: Scott C. Kowalczyk, Savage, MN (US); James J. Brandt, St. Louis Park, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 22 days.

(21) Appl. No.: 12/369,126

(22) Filed: Feb. 11, 2009

(65) Prior Publication Data

US 2010/0061685 A1    Mar. 11, 2010

Related U.S. Application Data

(63) Continuation of application No. 11/157,561, filed on Jun. 21, 2005, now Pat. No. 7,492,996.

(51) Int. Cl.
*G02B 6/00* (2006.01)

(52) U.S. Cl. ........ 385/136; 385/100; 385/134; 385/137; 439/95; 439/97; 439/92; 439/100; 439/101; 174/78

(58) Field of Classification Search .................. None
See application file for complete search history.

(56) References Cited

U.S. PATENT DOCUMENTS

| | | |
|---|---|---|
| 2,897,472 A | 7/1959 | O'Brien |
| 2,921,286 A | 1/1960 | Gordon |
| 3,052,866 A | 9/1962 | Koch |
| 4,106,832 A | 8/1978 | Burns |
| 4,236,188 A | 11/1980 | Prochazka |
| 4,674,832 A | 6/1987 | Hirai et al. |
| 4,684,205 A * | 8/1987 | Margolin et al. ............... 385/68 |
| 4,709,980 A | 12/1987 | Coll et al. |
| 5,036,164 A | 7/1991 | Schrader et al. |
| 5,380,227 A | 1/1995 | Taylor |
| 5,636,306 A * | 6/1997 | Mock et al. .................... 385/101 |
| 5,679,030 A * | 10/1997 | Chadbourne et al. .......... 439/778 |
| 5,732,180 A | 3/1998 | Kaplan |
| 5,823,804 A | 10/1998 | Auclair |
| 6,329,592 B1 | 12/2001 | Auclair |
| 6,734,355 B1 | 5/2004 | Auclair |
| 7,492,996 B2 * | 2/2009 | Kowalczyk et al. ........... 385/100 |
| 2005/0213921 A1 | 9/2005 | Mertesdorf et al. |

FOREIGN PATENT DOCUMENTS

| | | |
|---|---|---|
| EP | 0 286 349 A2 | 10/1988 |
| EP | 0 509 299 A1 | 10/1992 |
| FR | 2 750 243 A1 | 12/1997 |
| GB | 1187077 | 4/1970 |

(Continued)

OTHER PUBLICATIONS

Photographs of a Prior Art Grounding Lug, 2 pages (Publicly known at least as early as Jun. 21, 2005).

(Continued)

*Primary Examiner* — Uyen-Chau N Le
*Assistant Examiner* — Chad H Smith
(74) *Attorney, Agent, or Firm* — Merchant & Gould P.C.

(57) ABSTRACT

An external grounding arrangement for a fiber access terminal includes a lug extending through a housing of the terminal. The lug is connected to strength members of a fiber optic cable extending to the terminal by a clamp about the cable within the terminal and a rod extending from the clamp to the lug.

12 Claims, 19 Drawing Sheets

FOREIGN PATENT DOCUMENTS

| | | |
|---|---|---|
| GB | 1 493 713 | 11/1977 |
| GB | 2 181 270 A | 4/1987 |
| WO | WO 94/24598 | 10/1994 |
| WO | WO 98/42047 | 9/1998 |

OTHER PUBLICATIONS

Photographs of a Prior Art Grounding Clamp, 4 pages (Publicly known at least as early as Jun. 21, 2005).

* cited by examiner

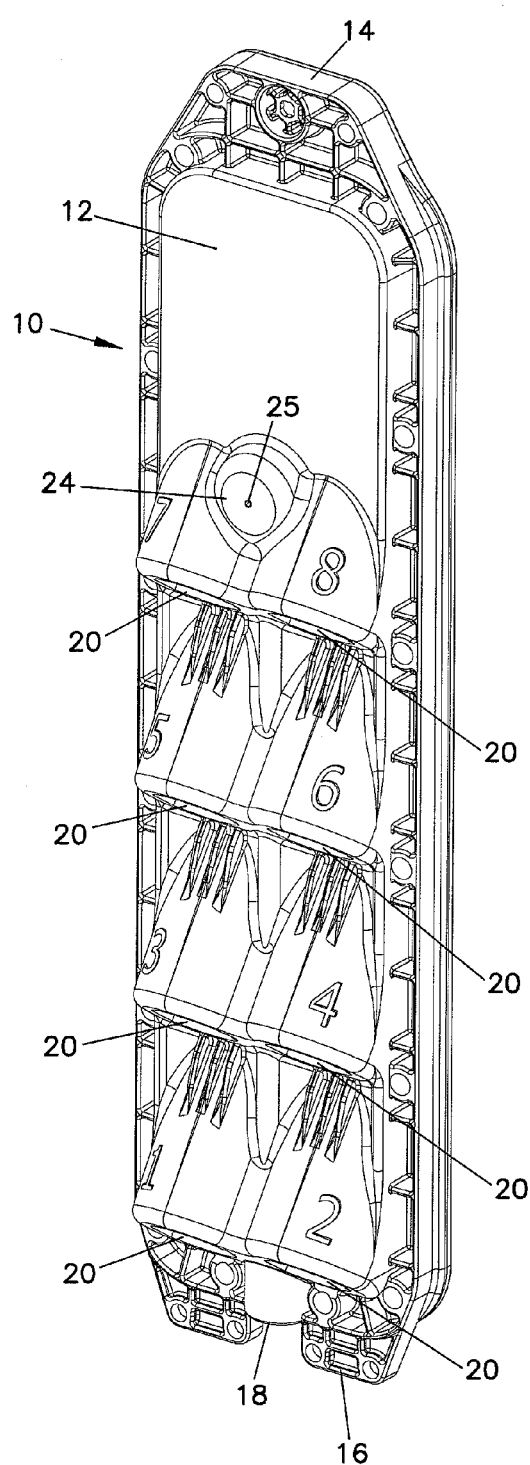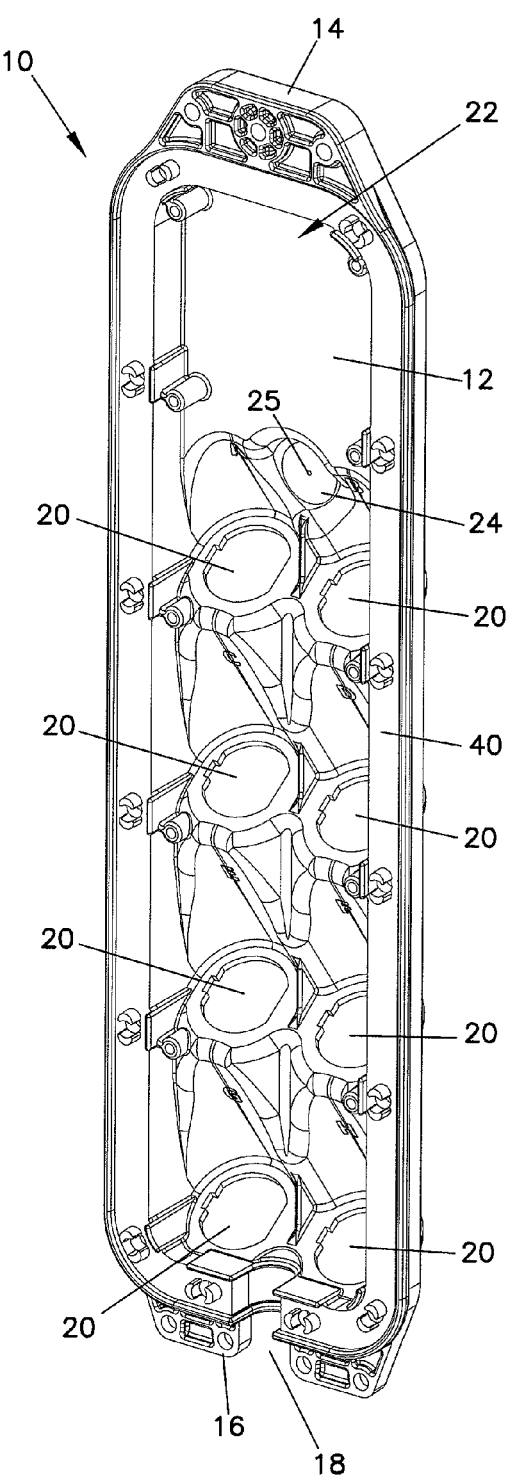

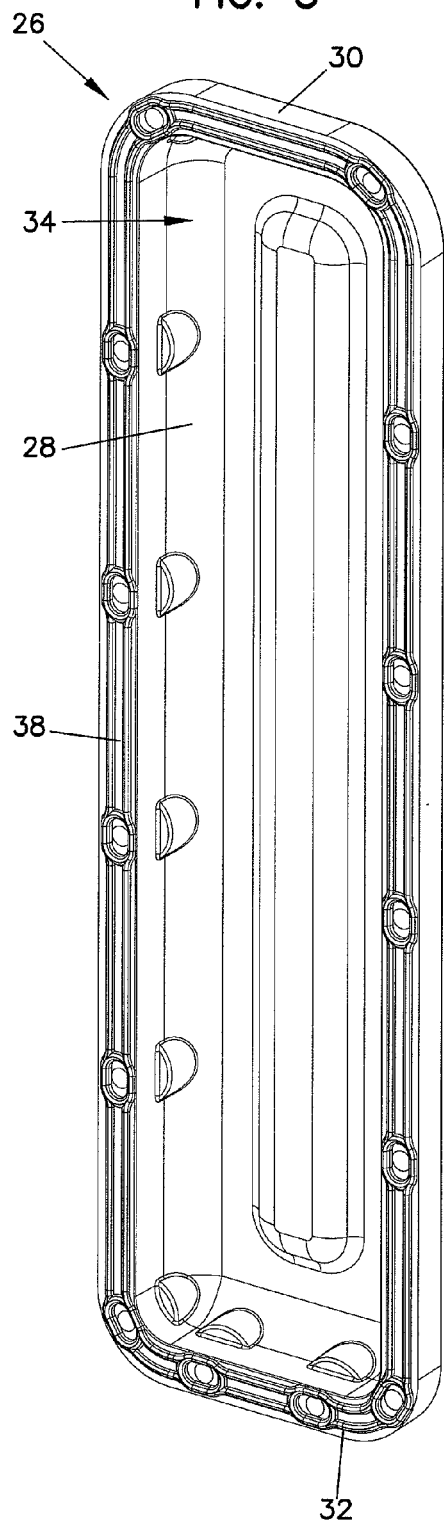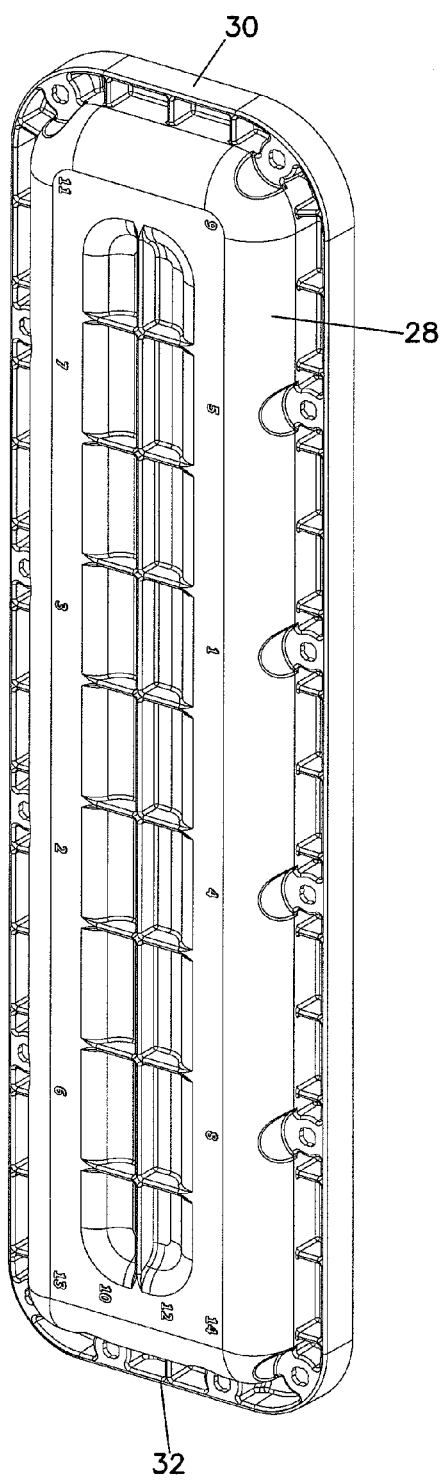

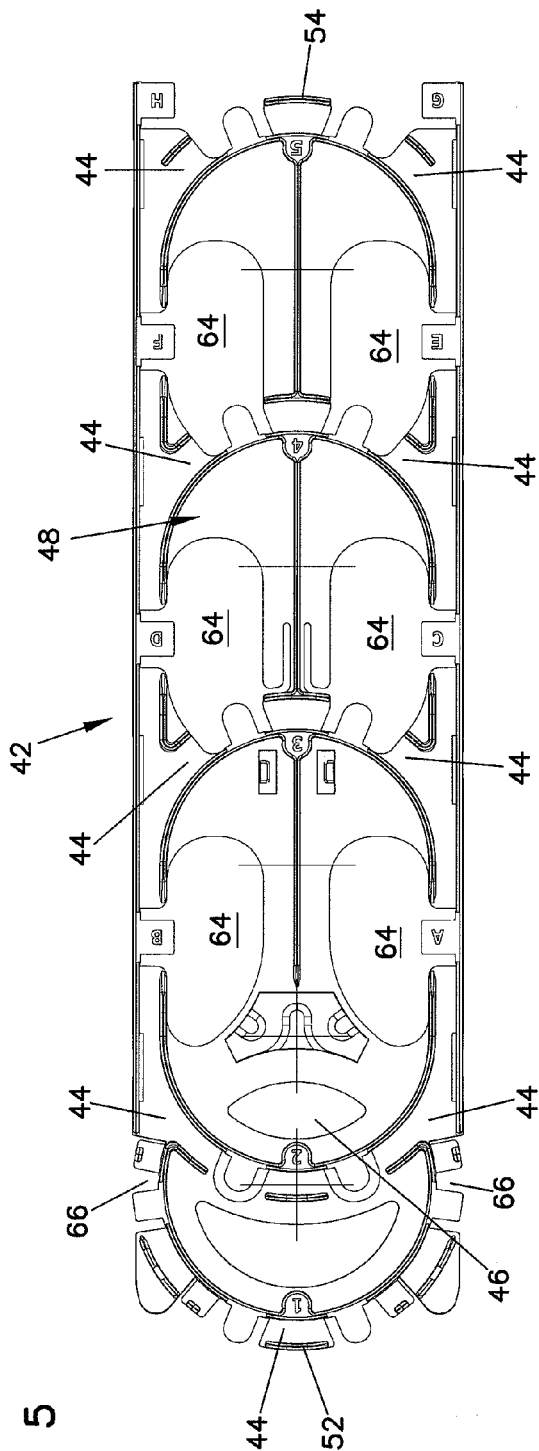
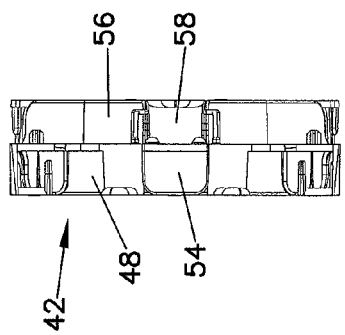
FIG. 5
FIG. 6

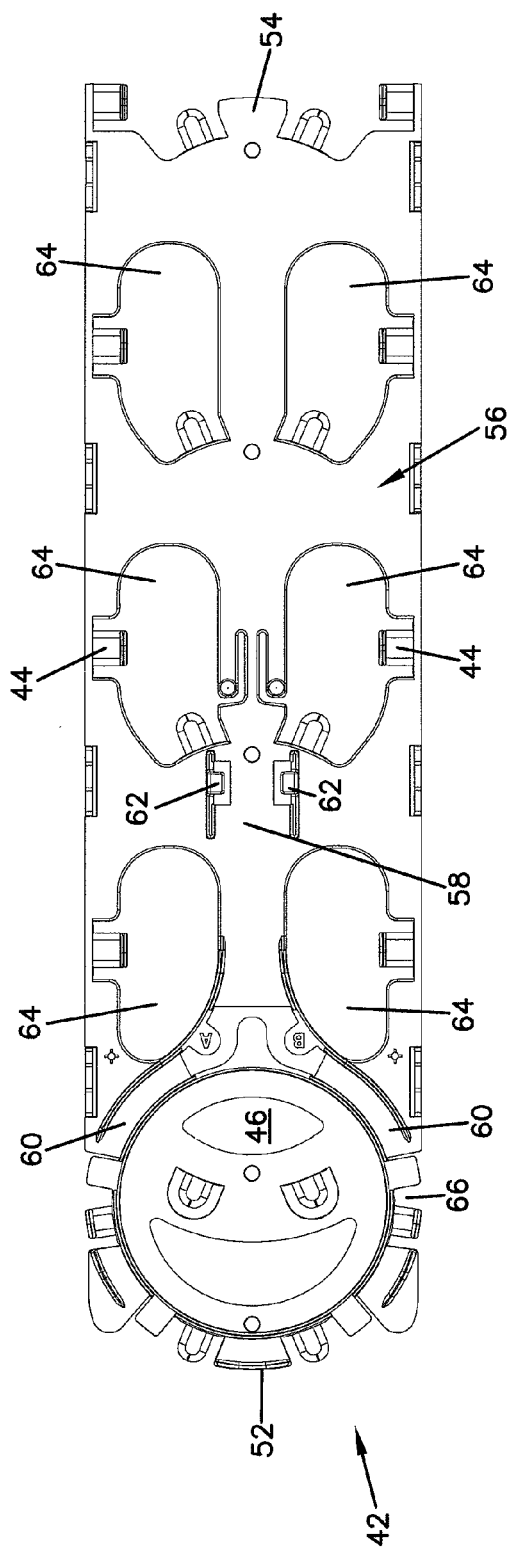
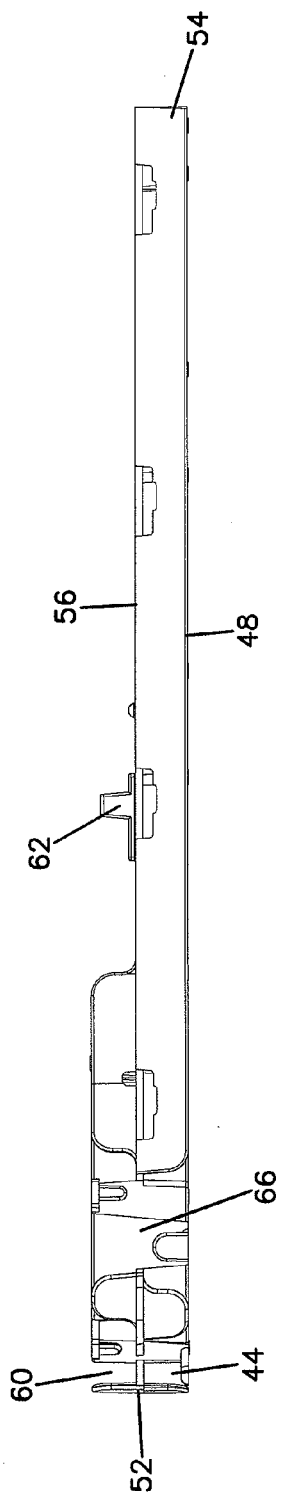
FIG. 7
FIG. 8

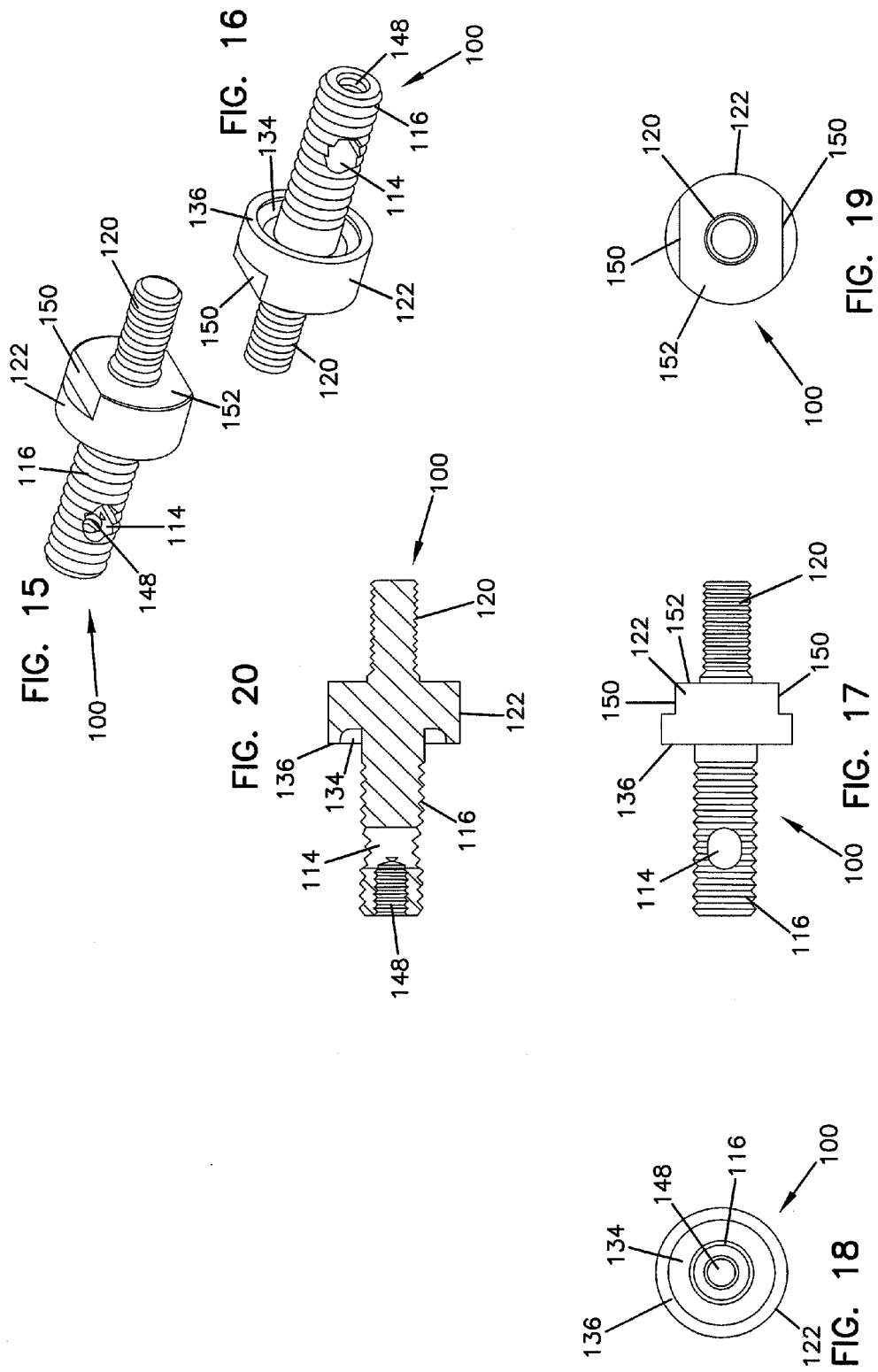

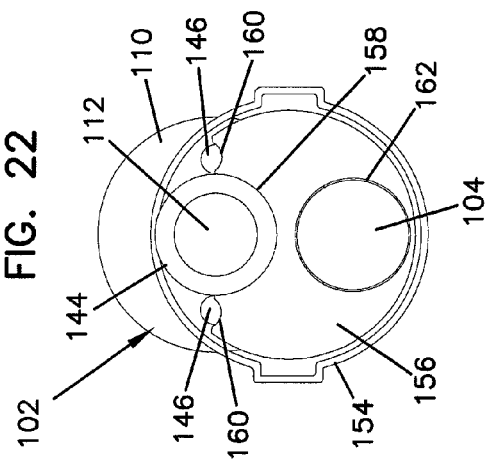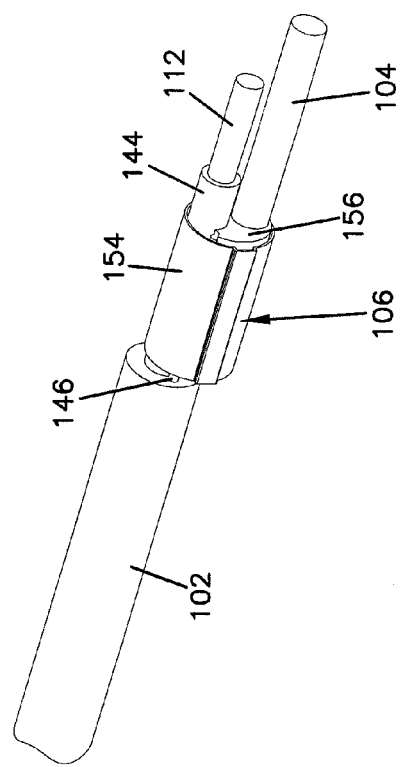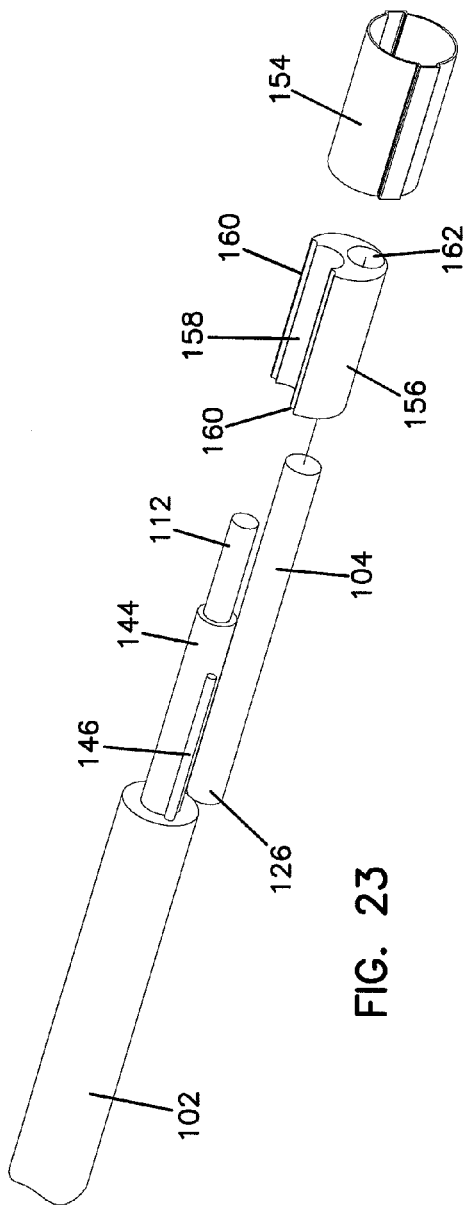

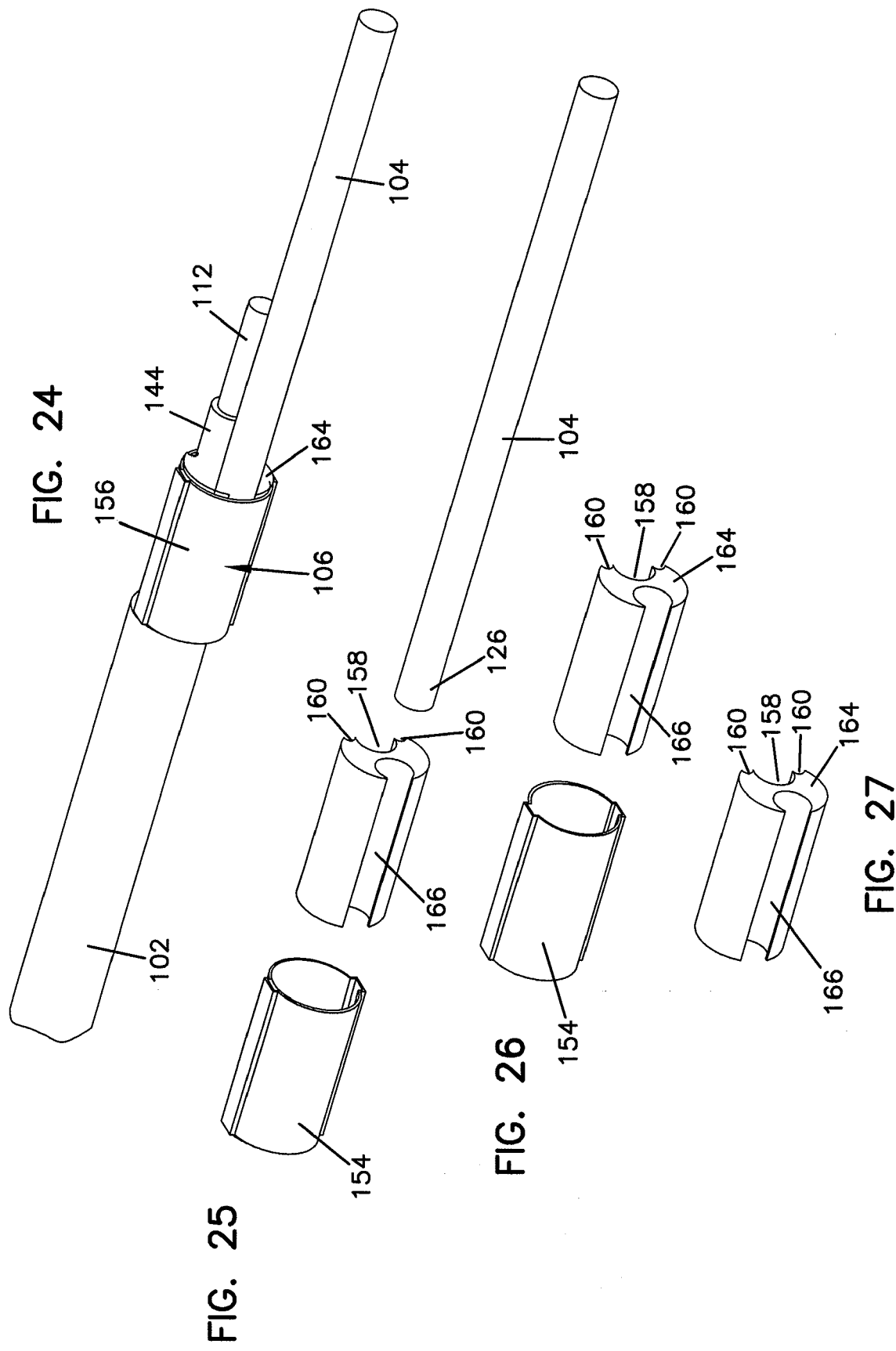

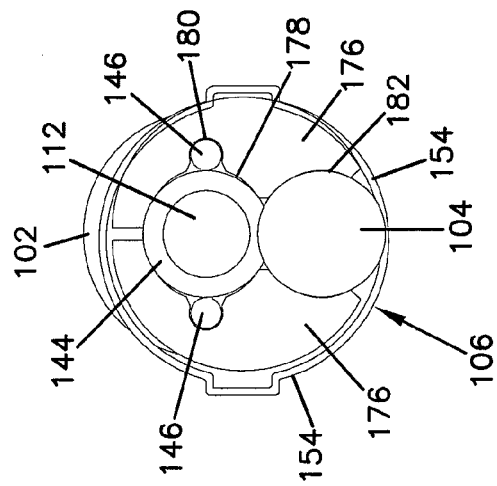
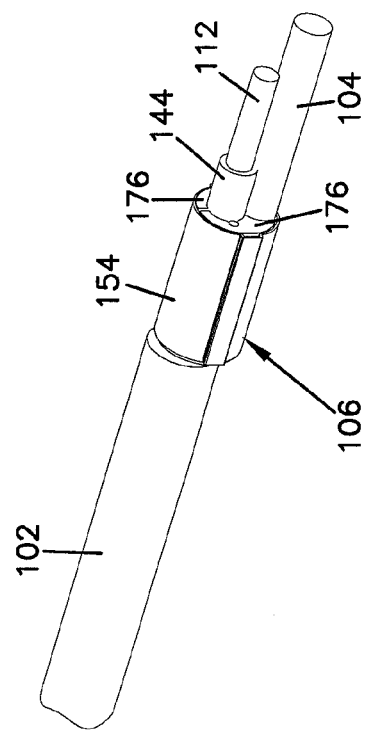
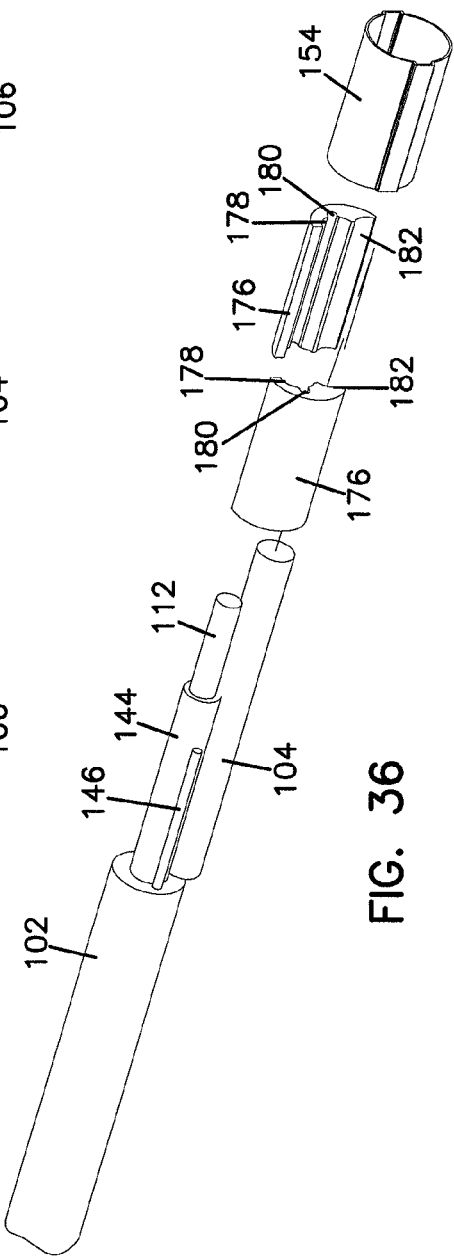

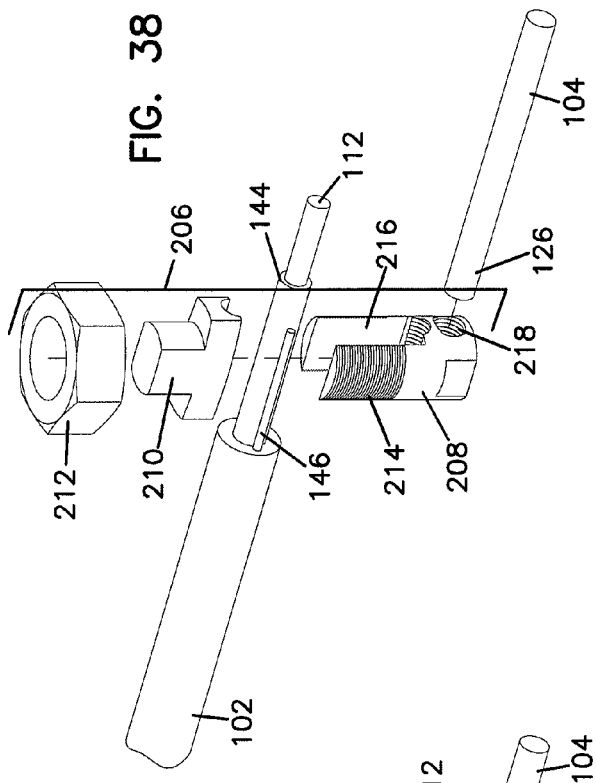
FIG. 38
FIG. 37
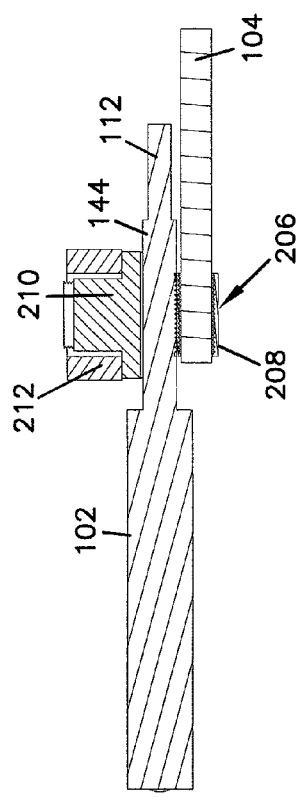
FIG. 39

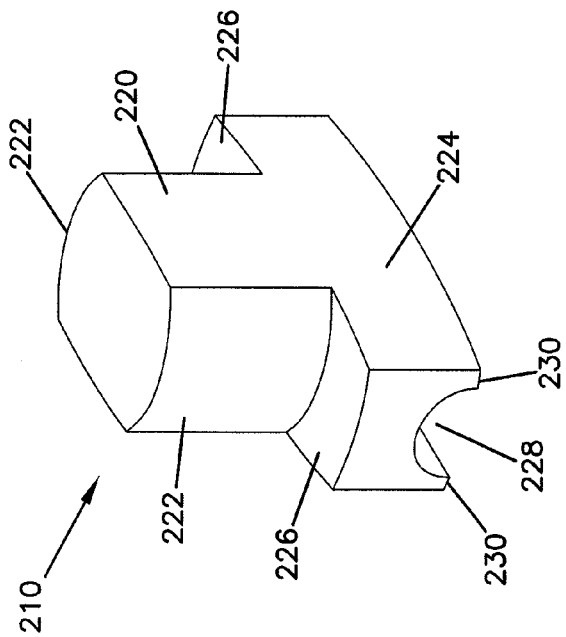
FIG. 40
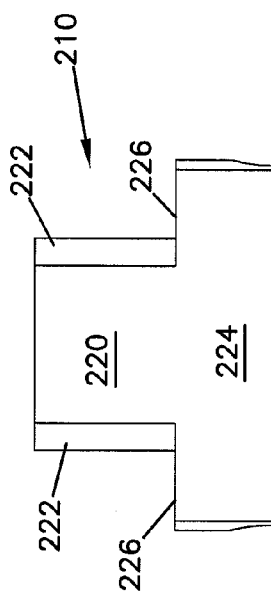
FIG. 41
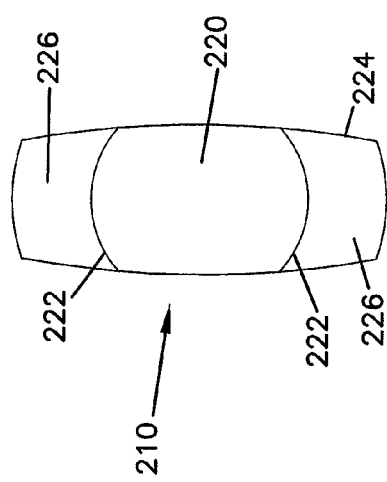
FIG. 42
FIG. 43

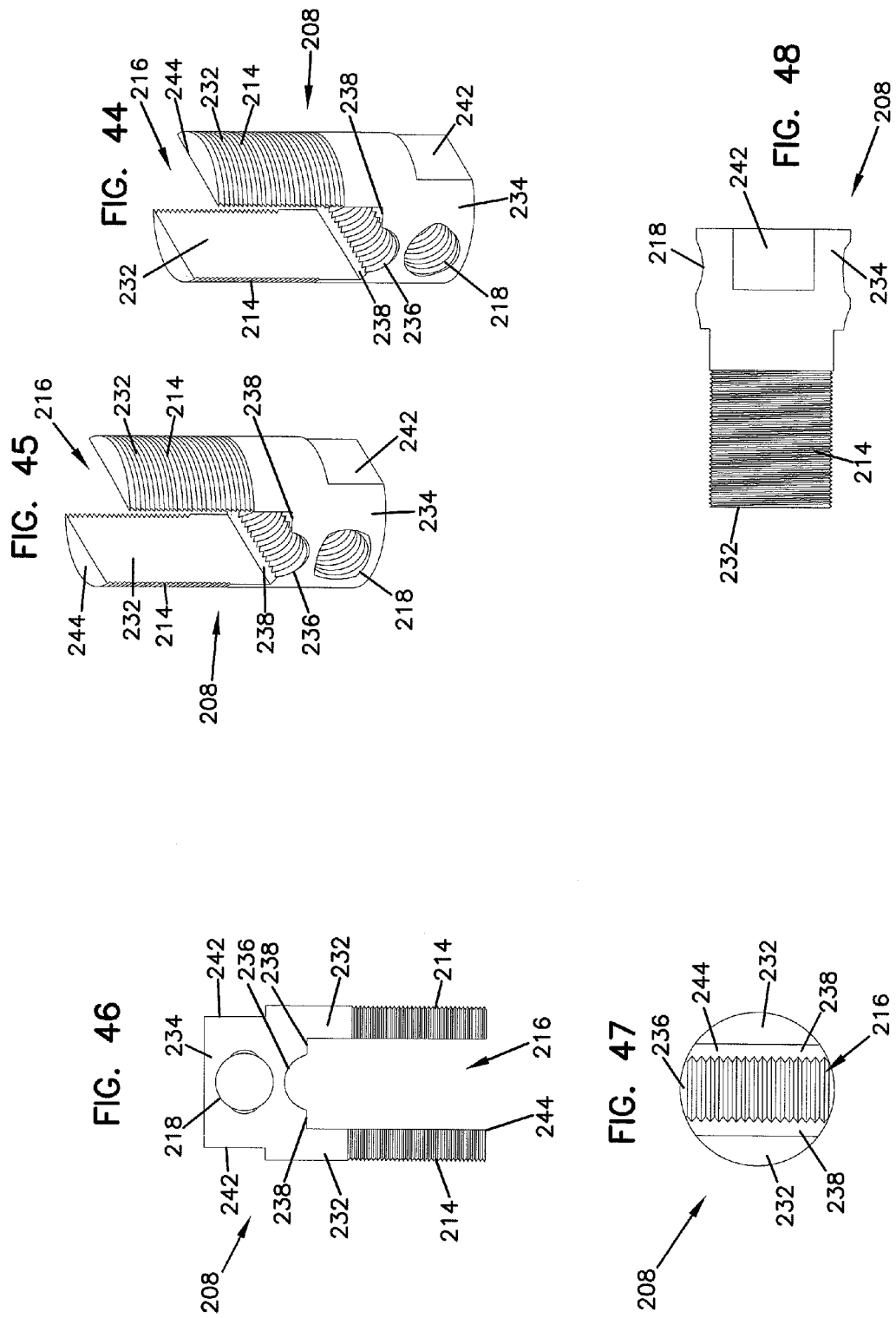

US 8,023,793 B2

GROUNDING DEVICE FOR ARMORED CABLE

CROSS REFERENCE TO RELATED APPLICATION

This application is a continuation of application Ser. No. 11/157,561, filed Jun. 21, 2005, now U.S. Pat. No. 7,492,996, which application is incorporated herein by reference.

TECHNICAL FIELD

The present invention relates generally to fiber access terminals and more specifically to grounding device for fiber access terminals.

BACKGROUND

In the telecommunications industry, service is increasingly being extended to new and existing customers through optical fiber networks and cables. Armored optical fiber cables may be used when service is extended to areas where the cables may be subjected to environmental stresses or other physical damage. These armored cables may include longitudinal strength members running parallel to the optical fibers within the cable, providing protection against tension being exerted on the cable being transferred to the fibers. These strength members may be made from electrically transmissive materials, such as steel or other similar materials.

While these strength members protect the fibers within the armored cable, they can also provide a path for stray bursts of electrical energy to be transmitted through the optical network. These bursts can damage equipment to which the fibers may be connected or may injure technicians who may be working on the network. It is desirable that some path to ground be provided to aid the redirection or dissipation of this electrical energy.

SUMMARY

An external grounding arrangement for a fiber access terminal includes a lug extending through a housing of the terminal. The lug is connected to strength members of a fiber optic cable extending to the terminal by a clamp about the cable within the terminal and a rod extending from the clamp to the lug.

BRIEF DESCRIPTION OF THE DRAWINGS

The accompanying drawings, which are incorporated in and constitute a part of the description, illustrate several aspects of the invention and together with the detailed description, serve to explain the principles of the invention. A brief description of the drawings is as follows:

FIG. 1 is a first perspective view of a housing of a fiber optic terminal.

FIG. 2 is a second perspective view of the housing of FIG. 1.

FIG. 3 is a first perspective view of a removable cover for use with the housing of FIG. 1.

FIG. 4 is a second perspective view of the cover of FIG. 3.

FIG. 5 is a top view of a fiber management insert for use within a fiber access terminal enclosure.

FIG. 6 is an end view of fiber management insert of FIG. 5.

FIG. 7 is a bottom view of the fiber management insert of FIG. 5.

FIG. 8 is a side view of the fiber management insert of FIG. 5.

FIG. 15 is a first perspective view of the grounding lug of FIG. 14.

FIG. 16 is a second perspective view of the grounding lug of FIG. 14.

FIG. 17 is a side view of the grounding lug of FIG. 14.

FIG. 18 is a first end view of the grounding lug of FIG. 14.

FIG. 19 is a second end view of the grounding lug of FIG. 14.

FIG. 20 is a side cross-sectional view of the grounding lug of FIG. 14.

FIG. 21 is a perspective view of the cable clamp of FIG. 12 for mounting the grounding bar to the fiber optic cable, according to the present invention.

FIG. 22 is an end view of the cable clamp of FIG. 21.

FIG. 23 is an exploded perspective view of the cable clamp of FIG. 21.

FIG. 24 is a perspective view of an alternative cable clamp for mounting the grounding bar to the fiber optic cable, according to the present invention.

FIG. 25 is an exploded perspective view of a ground sleeve, a crimp sleeve and the grounding bar of the cable clamp of FIG. 24.

FIG. 26 is an exploded perspective view of the ground sleeve and crimp sleeve of the cable clamp of FIG. 24.

FIG. 27 is a first perspective view of the ground sleeve of the cable clamp of FIG. 24.

FIG. 34 is a perspective view of a second alternative cable clamp for mounting the grounding bar to the fiber optic cable, according to the present invention, with a two piece grounding sleeve.

FIG. 35 is an end view of the cable clamp of FIG. 34.

FIG. 36 is an exploded perspective view of the cable clamp of FIG. 34.

FIG. 37 is a perspective view of a third alternative cable clamp for mounting the grounding bar to the fiber optic cable, according to the present invention.

FIG. 38 is an exploded perspective view of the cable clamp of FIG. 37.

FIG. 39 is a side cross-sectional view of the cable clamp of FIG. 37.

FIG. 40 is a perspective view of the compression insert of the cable clamp of FIG. 37.

FIG. 41 is a side view of the compression insert of FIG. 40.

FIG. 42 is a top view of the compression insert of FIG. 40.

FIG. 43 is an end view of the compression insert of FIG. 40.

FIG. 44 is a first perspective view of the split stud of the cable clamp of FIG. 37.

FIG. 45 is a second perspective view of the split stud of FIG. 44.

FIG. 46 is a first side view of the split stud of FIG. 44.

FIG. 47 is a top view of the split stud of FIG. 44.

FIG. 48 is a second side view of the split stud of FIG. 44.

DETAILED DESCRIPTION OF THE PREFERRED EMBODIMENT

Figure 9:
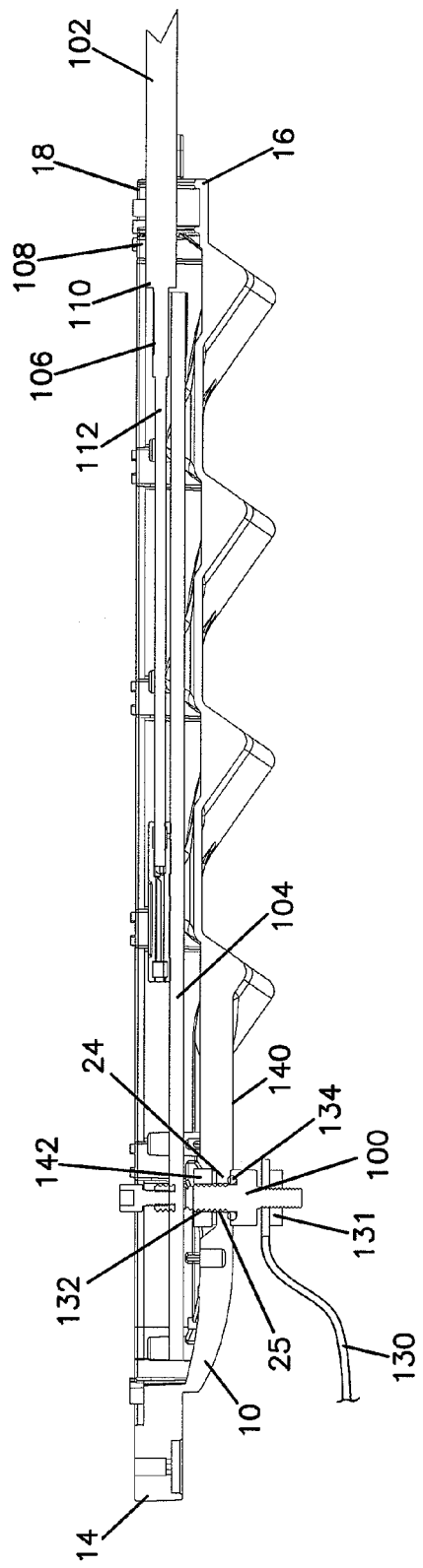
FIG. 9 is a side cross-sectional view of the housing for a fiber access terminal connected to a ground according to the present invention.

Reference will now be made in detail to exemplary aspects of the present invention which are illustrated in the accompanying drawings. Wherever possible, the same reference numbers will be used throughout the drawings to refer to the same or like parts.

Fiber access terminals provide service providers with connections between fiber distribution cables and customer fiber drop cables. One fiber access terminal is shown in commonly owned U.S. patent application Ser. No. 11/075,847, filed Mar. 8, 2005, the disclosure of which is incorporated herein by reference. Such terminals provide a mounting location for ruggedized fiber optic connectors which may be used to optically connect and protect ends of the distribution and drop fibers. Often these distribution cables include multiple strands of optical fiber within a central channel within an outer protective sheath. Additionally, such cables may include linear or longitudinal strength members extending parallel to the fibers to protect the fibers from damage due to tension. Often these strength members are made of a durable metallic material, such as steel, which can also transmit electrical pulses along the distribution cables.

It is desirable to provide a mounting location within the fiber access terminal to permit the strength members of the distribution cable to be secured to a housing of the terminal. It is also desirable to provide for dissipation or grounding of any electrical impulses transmitted along the strength member to avoid damage to telecommunications equipment or injury to technicians working on the equipment.

A fiber access terminal in accordance with the present invention includes a housing 10 (shown in FIGS. 1 and 2) and a removable cover 26 (shown in FIGS. 3 and 4). Referring now to FIGS. 1 and 2, housing 10 includes a body 12 with a top 14 and base 16. A cable entry 18 extends through base 16 into an interior 22. A plurality of openings 20 are provided for mounting of hardened or ruggedized fiber optic connectors (not shown). A flat 24 may include an opening 25 which may provide a mounting location for a grounding lug, as will be described below.

Referring now to FIGS. 3 and 4, removable cover 26 includes a body 28 with a top 30 and a base 32. Cover 26 defines an interior 34 which cooperates with interior 22 of housing 10 to enclose an interior space of the fiber access terminal. A sealing surface 38 extends about cover 26 adjacent an outer edge and cooperates with a corresponding sealing surface 40 of housing 10 to seal the cover 26 to housing 10 and prevent intrusion into the interior space.

A fiber management structure 42, as shown in FIGS. 5 to 8, may be placed within interior 24 of housing 10 and within the interior space of the fiber access terminal. Fiber management structure 42 may include a plurality of cable paths 44 on a second side 48 for directing individual fibers from the distribution cable to connectors mounted in openings 20. An opening 46 is included to permit access to a grounding lug mounted in flat 24 when structure 42 is positioned within housing 10. On a first side 56 of fiber management structure 42 is a distribution cable path 58 which is aligned with cable entry 18 when structure 42 is positioned within housing 10. Path 58 extends from a base end 54 toward to top end 52.

On first side 56, cable path 58 may include a pair of mounts 62 for securing a fiber device, such as a fanout or a splitter, to which the distribution cable extends and from which a plurality of individual fiber cables extend. Adjacent top end 52 are a plurality of cable paths 60 into the individual fiber cables are extended to transition from first side 56 to second side 48, possibly through passages 66. Openings 64 provide a path for these optical fiber cables to extend from cable paths 44 to connectors mounted within openings 20 of housing 10.

Referring now to FIG. 9, housing 10 includes a grounding lug 100 according to the present invention and a fiber distribution cable 102 extending through cable entry 18 into interior 24. A clamping area 108 is provided within cable entry 18 to clamp about an outer sheath 110 of cable 102 and secure the cable and the housing with respect to each other. Within the outer sheath 110 are one or more strength members and an inner sheath within which is a core 112 with one or more strands of optical fibers. The inner sheath and the strength members extend from cable entry 18 toward top 14 where they are held by a clamp 106. A grounding rod 104 extends between grounding lug 100 and clamp 106, and electrically connects the electrically conductive elements of cable 102 to lug 100.

Figure 10:
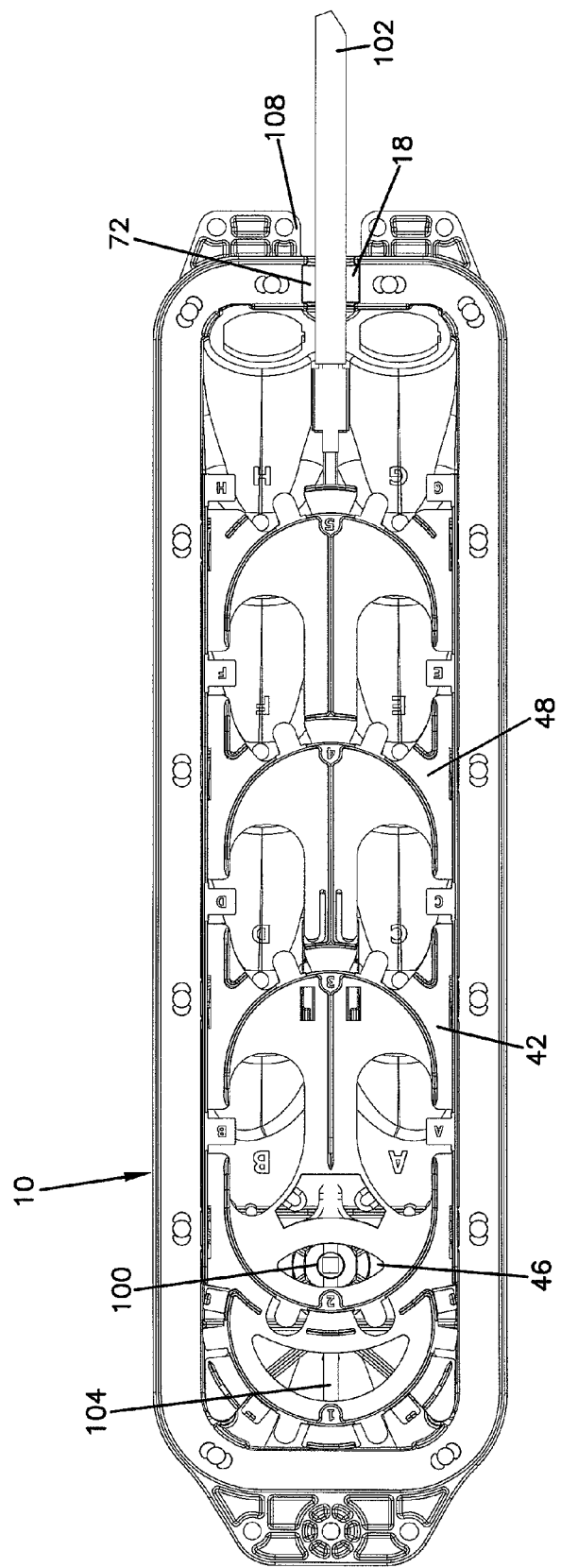
FIG. 10 is a top view of the housing of FIG. 9, with the fiber management insert of FIG. 5.
Figure 10A:
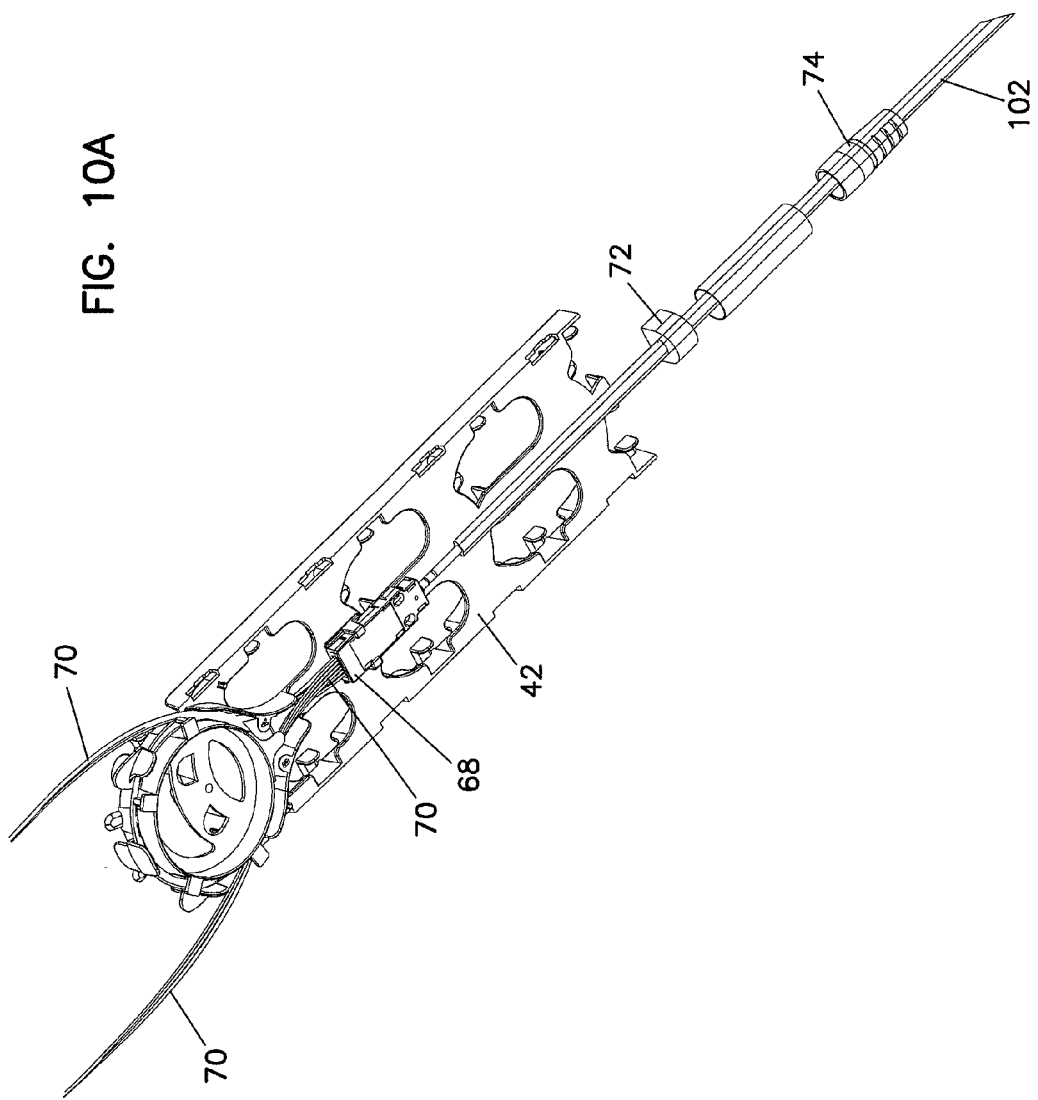
FIG. 10A is a perspective view of the fiber management structure of FIG. 5, with a optical fiber cable.

FIG. 10 shows housing 10 with lug 100 in place and fiber management structure 42 positioned atop cable 102 within interior 24. An upper end of lug 100 is accessible through opening 46. First side 56 of structure 42 is positioned toward cable 102. However, fiber management structure 42 is typically loaded with cable 102 and individual fiber strands 70, as shown in FIG. 10A, prior to positioning within housing 10. Fibers 70 are routed from first side 56 to second side 48 and into cable paths 44. Also in FIG. 10A, a fanout 68 is mounted to mounts 62 to aid the breakout of the individual strands of fiber 70 from cable 102. A grommet 72 is positioned about cable 102 to block cable entry 18 and aid forming a seal between housing 10 and cover 26. A strain relief boot may also be positioned about cable 102 to help protect cable 102 from damage as it enters housing 10.

Figure 11:
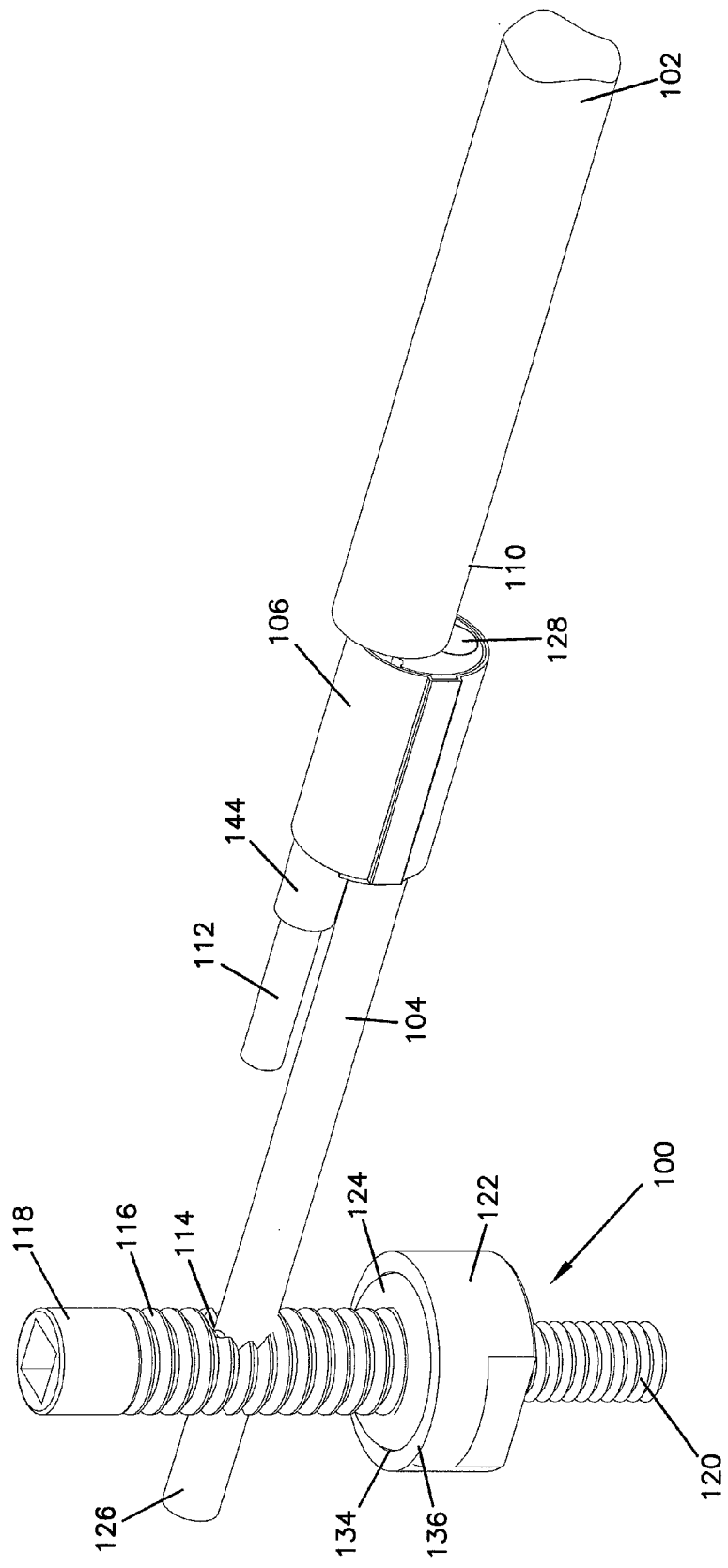
FIG. 11 is a perspective view of a grounding lug mounted to a fiber optic cable for use with the housing of FIG. 9.

Referring now to FIGS. 9 through 11, during the preassembly and loading of fiber management structure 42 prior to positioning within housing 10, grounding rod 104 is also connected to clamp 106. Lug 100 preferably provides a flexible and adjustable manner of electrically and physically connecting to rod 104. Such a flexible arrangement may permit a greater ease of assembly. As space within the interior of the fiber access terminal may be constricted, positioning rod 104 beneath structure 42 is otherwise unused space is also desirable. Such a flexible connection arrangement is shown in FIG. 11. Lug 100 includes an opening 114 in an inner portion 116 of lug 100, opening 114 sized to slidably receive a distal end 126 of rod 104. Rod 104 may be positioned within opening 114 as needed to ensure that clamp 106 and cable 102 are properly positioned when fiber management structure 42 is positioned within housing 10.

A set screw 118 is included in an inner end of inner portion 116 and set screw 118 may be advanced within an axial opening of lug 100 to intersect with rod 104 in opening 114 and lock rod 104 into place. This permits the length of rod 104 between clamp 106 and lug 100 to be adjusted as needed to fit within housing 10. It is anticipated that clamp 106 may not always be precisely located with respect to other elements of the fiber access terminal and the length of rod 104 is preferably variable to match.

Lug 100 also includes an outer portion 120 which extends beyond housing 10. Outer portion 120 is threaded to receive a fastener such as a nut 131 to permit attachment of an exterior ground cable 130 (see FIG. 9). Between inner portion 116 and outer portion 120 of lug 100 is a central portion 122 which is of a greater diameter than an opening 132 in flat 24 through which lug 100 extends. An o-ring 124 fits within a recess 134 on an inner surface 136 and is drawn against an outer surface 140 of housing 10 when a nut 142 is advanced along threads of inner end 116.

Figure 12:
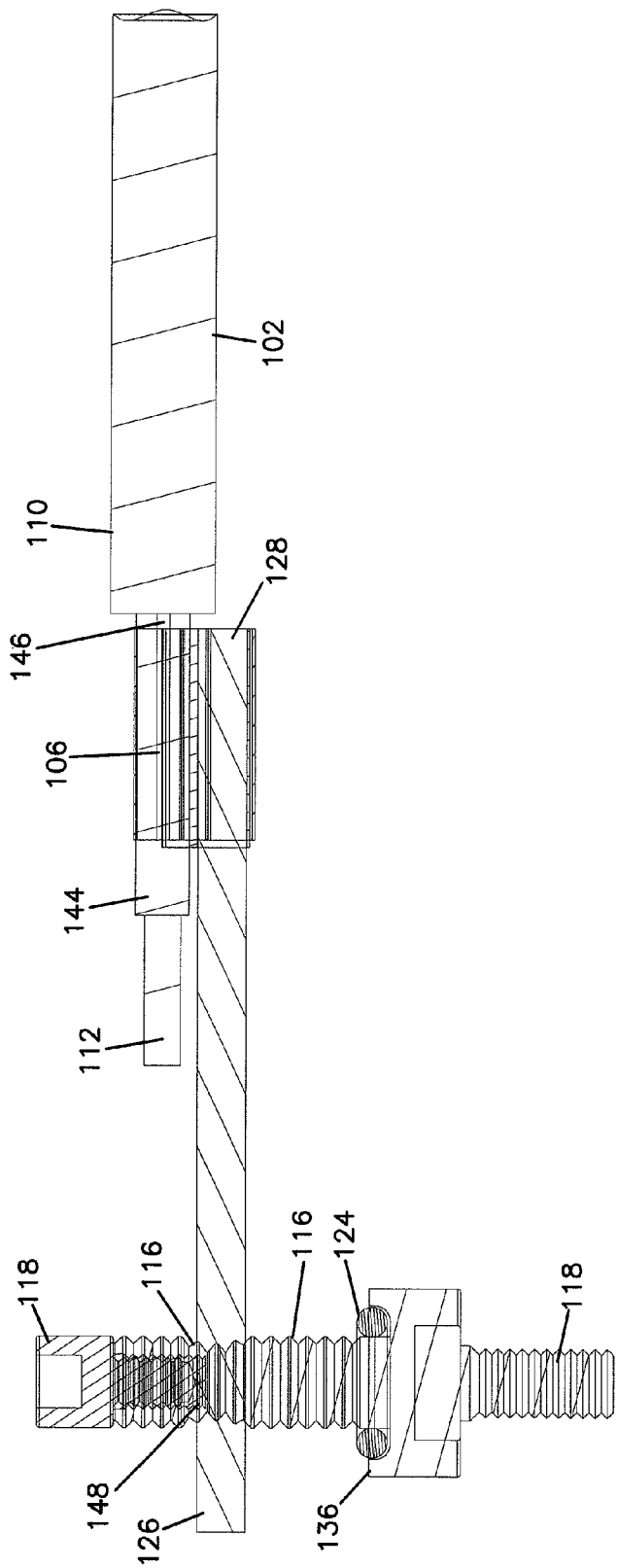
FIG. 12 is a side cross-sectional view of the grounding lug and cable of FIG. 11.
Figure 14:
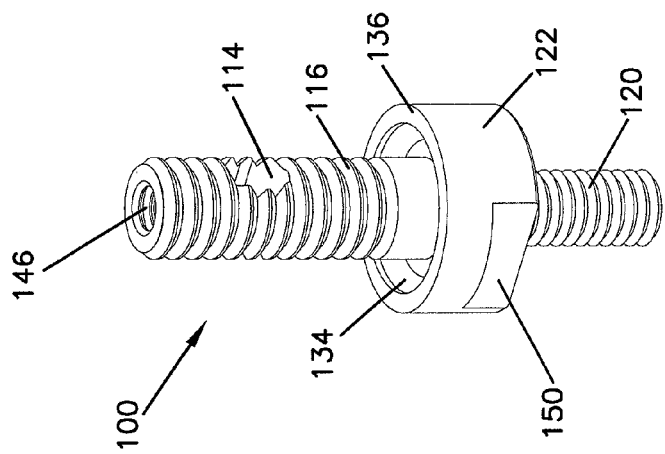
FIG. 14 is a perspective view of the grounding lug of FIG. 11, with the ground bar, the set screw for clamping the ground bar and the o-ring removed.
Figure 13:
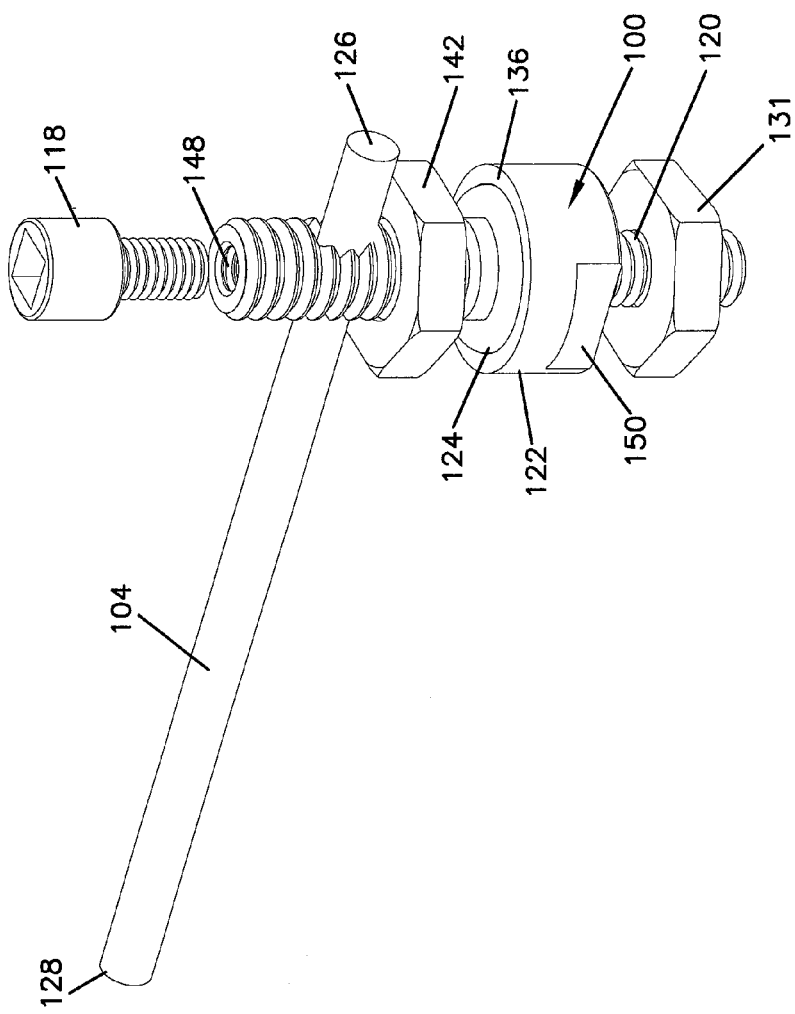
FIG. 13 is an exploded perspective view of the grounding lug of FIG. 11, with a locking nut for mounting the lug to the housing of FIG. 11.
Figure 28:
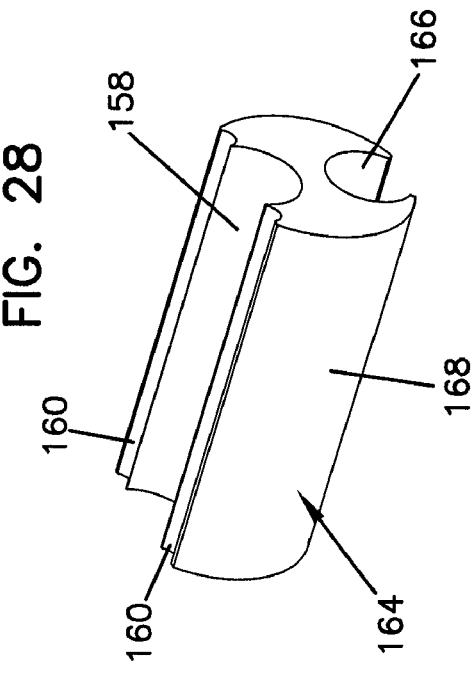
FIG. 28 is a second perspective view of the ground sleeve of FIG. 27.
Figure 30:
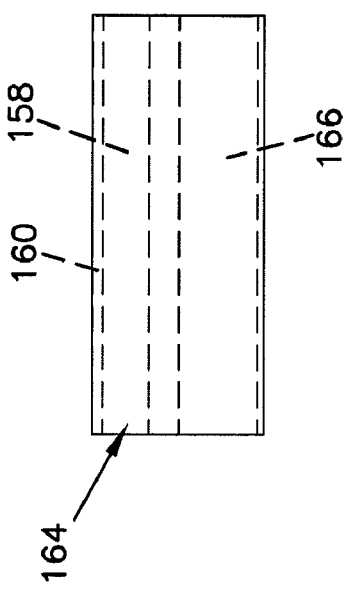
FIG. 30 is a side view of the ground sleeve of FIG. 27, including dashed lines to indicate hidden lines.
Figure 29:
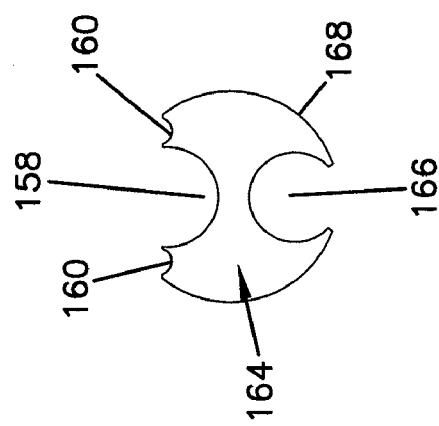
FIG. 29 is an end view of the ground sleeve of FIG. 27.

Referring now also to FIGS. 12 and 13, a linear strength member 146 of cable 102 is shown extending from the outer sheathing 110 into clamp 106. Strength member 146 extends along an inner sheathing 144 about core or inner bundle 112. Strength members 146 may be made of an electrically conductive material, such as steel or other conductive materials. Inner sheathing 144 may also include some electrically conductive elements. Individual fibers 70 extend within core 112. A proximal end 128 of rod 104 is secured within clamp 106. Set screw 118 is received in an axial opening 148 which extends into opening 114. Central portion 122 may include wrench flats 150 to aid in assembly of lug 100 to housing 10.

FIGS. 14 to 20 show lug 100 removed from housing 10 and with nuts 131 and 142, and rod 104 removed. O-ring 124 has been removed from recess 134. Central portion 122 includes an outer surface 152 against which nut 131 secures ground cable 130 to ensure electrical contact between lug 100 and ground cable 130. Lug 100 is preferably made of good conductive material such as copper or a copper alloy, although other suitable conductive materials may be used.

Referring now FIGS. 21 to 23, clamp 106 includes an outer crimp sleeve 154 and an inner sleeve 156. Inner sleeve 156 includes a longitudinal fiber recess 158 which receives core 112 and inner sheath 144. A pair of strength member recesses 160 extend along recess 158 and receive strength members 146 of cable 102. An opening 162 receives distal end 126 of rod 104. Crimp sleeve 154 fits about inner sleeve 156 and is tightly crimped about inner sleeve 156 to bind or clamp the different elements within the various recesses or openings. Opening 162 may be threaded to improve grip about rod 104 and distal end 126 of rod 104 may also be threaded with mating threads. Recesses 160 and 158 may be grooved or threaded to improve the mechanical connection with strength members 146 and inner sheath 144, respectively. In addition to be securely mechanically connected to clamp 106, strength members 146 and also inner sheath 144 (if it includes electrically conductive elements) are electrically connected to clamp 106.

As shown in FIGS. 21 to 23, recess 158 is sized to receive and crimp about inner sheathing 144. It is preferable that recess 158 not be compressed too tightly about sheathing 144 to ensure that none of the fibers 70 within core 112 are crimped. Any crimping or mechanical locking of sheath 144 to fibers 70 may damage the fibers.

Alternatively, as shown in FIGS. 24 to 30, an inner sleeve 164 may include a longitudinal recess 166 to receive rod 104. With the exception of recess 166 extending through an outer surface 168 of inner sleeve 164, inner sleeves 164 and 156 are generally configured alike.

Figure 31:
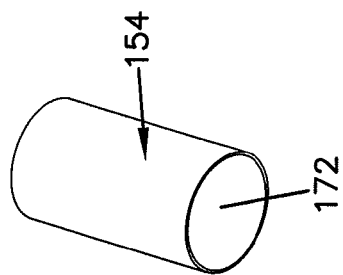
FIG. 31 is a perspective view of an alternative crimp sleeve for use with the cable clamp of FIG. 24.
Figure 33:
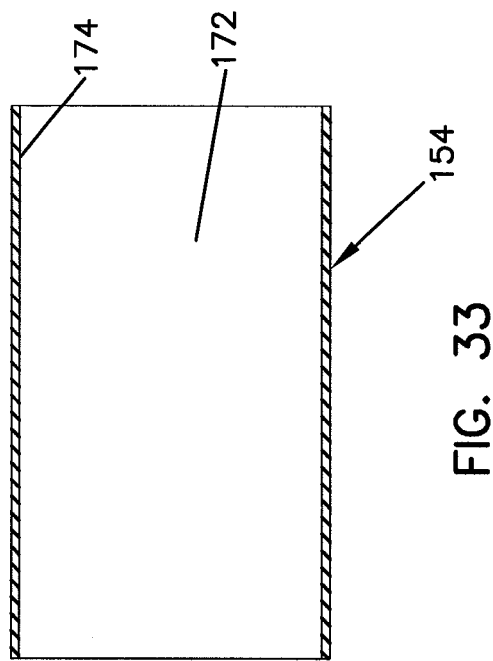
FIG. 33 is a side cross-sectional view of the crimp sleeve of FIG. 31.
Figure 32:
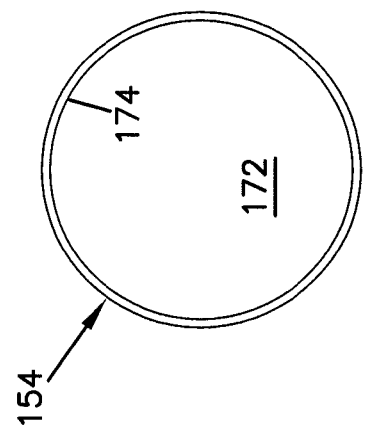
FIG. 32 is an end view of the crimp sleeve of FIG. 31.

FIGS. 31 to 33 show crimp sleeve 154 in an uncrimped state and including an opening 172 within which an inner sleeve is received. An inner surface 174 within opening 172 may be compressed closely about the inner sleeve and different components which may be with recesses of the inner sleeve.

FIGS. 34 to 36 show clamp 106 within an alternative inner sleeve arrangement including a pair of identical sleeve halves 176. Each sleeve half 176 includes a longitudinal recess 178 for receiving inner sheath 144, a longitudinal recess 180 for receiving strength member 146 and a longitudinal recess 182 for receiving rod 104. Any or all of these recesses may be threaded, knurled or include some other surface pattern or texture to improve mechanical grip with respect to the components received within them.

FIGS. 37 to 39 show an alternative clamp 206 including a split lug 208, a compression insert 210 and a nut 212. Nut 212 threads about external threads 214 of split lug 208 and insert 210 is received within a split 216 defined by split lug 208. Distal end 126 of rod 104 is received within an opening 218 which may be threaded to improve mechanical grip between lug 208 and rod 104. Distal end 126 of rod 104 may also be threaded to engage the threads within opening 218.

FIGS. 40 to 43 show compression insert 210 with an upper portion 220 including curved end surfaces 222. Upper portion 220 fits within nut 212 and curved end surfaces are generally matched to the curvature of threads 214, though defining a slightly smaller diameter so as not to interfere with advancement of nut 212 along threads 214. A lower portion 224 includes a pair of engagement surfaces 226 which nut 212 engages as the nut is advanced along threads 214. Opposite engagement surfaces 226 is a recess 228 for receiving inner sheath 144 and core 112. Along recess 228 are a pair of shoulders 230 which cooperate with corresponding shoulders within split 216 to clamp about strength members 146 and also to prevent over compression of core 112 which may damage fibers 70.

FIGS. 44 to 48 illustrate split lug 208 with a pair of arms 232 extending from a base 234 to define split 216. Base 234 closes a bottom end of split 216 opposite an open top end 244. Within split 216 is a core recess 236 flanked by a pair of shoulders 238. Shoulders 238 cooperate within shoulders 230 of compression insert 210 to both clamp tightly about strength members 146 but also prevent over compression of core 112 within the combined cores recesses 228 and 236. As shown, recess 236 may be threaded or otherwise provided with a surface pattern or texture to improve mechanical linkage with core 112 without over compression of core 112. Similarly, recess 228 of compression insert 210 may also be threaded or provided with a surface pattern or texture to improve mechanical linkage with core 112 without over compression of core 112. Opening 218 in base 234 receives rod 104 and may be threaded as shown. Base 234 also may include a pair of wrench flats 242 to aid in assembly.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A grounding clamp for a fiber optic cable, the grounding clamp comprising:
   a split lug with a pair of arms extending from a base defining an open ended split;
   a compression insert positioned within the split;
   the base within the split including a first recess flanked by a pair of shoulders, the compression insert including a lower end with a corresponding recess flanked by a pair of shoulders, the shoulders of the base and the compression insert cooperating to form a clamp for clamping to longitudinal strength members of the fiber optic cable, and the recesses of the base and the compression insert cooperating to form an opening through which a fiber core of the fiber optic cable may extend, wherein the shoulders of the base and the compression insert oppose each other and are configured to apply a compression force on the longitudinal strength members of the fiber optic cable while the shoulders of the base and the compression insert are configured to prevent overcompression of the fiber core of the fiber optic cable.

2. The grounding clamp of claim 1, wherein the recess of the base is threaded.

3. The grounding clamp of claim 1, wherein the base includes a transverse opening extending through generally parallel to the split and wherein the transverse opening through the base is threaded.

4. The grounding clamp of claim 1, wherein the base includes a pair of opposing wrench flats.

5. The grounding clamp of claim 3, further comprising a grounding rod inserted within the transverse opening.

6. A grounded fiber optic cable assembly comprising:
a fiber optic cable with an outer sheath, an inner core, and at least one longitudinal strength member extending alongside the core;
a clamp positioned about the inner core and the at least one strength member of the fiber optic cable, the clamp including a first member configured to move toward a second member along a first direction to clamp the cable, the first member including a first recess and a first flat surface adjacent the first recess, the second member including a second recess and a second flat surface adjacent the second recess, the first and second recesses cooperating to form a first opening through which the inner core is received, the first flat surface and the second flat surface defining oppositely facing flat surfaces that are aligned with each other along the first direction, wherein the first flat surface and the second flat surface are configured to capture therebetween and apply a compression force along the first direction on the longitudinal strength member extending alongside the core to clamp the longitudinal strength member while preventing an overcompression of the core;
a grounding rod extending from the clamp to a ground source.

7. The assembly of claim 6, wherein the rod is received within an opening extending through the clamp.

8. The assembly of claim 6, wherein the clamp includes a split lug with a pair of arms and a base defining a split within which the inner core and the at least one strength member are received, a compression insert positioned within the split about the inner core and the at least one strength member, and a nut threaded about the arms urging the compression insert toward the base.

9. A grounding clamp for a fiber optic cable comprising:
a body with a base and a pair of arms defining a slot, the base including a recess and a pair of shoulders on either side of the recess adjacent the arms;
a compression insert sized to fit within the slot with an upper portion and a lower portion, the lower portion including a recess, a pair of shoulders on either side of the recess and a pair of engagement surfaces extending beyond the arms, the upper portion sized to fit within the arms;
the recesses of the base and the compression insert cooperating to form a fiber opening through which the fiber optic cable may extend;
the shoulders of the base and the compression insert cooperating to form clamping surfaces to engage a longitudinal strength member of the fiber optic cable and electrically connect the body to the strength members;
a fastener engageable with the arms, the fastener positionable about the upper portion of the compression insert and engaging the engagement surfaces of the compression insert to urge the compression insert within the slot toward the base;
the shoulders of the base and the compression insert opposing each other and further cooperating to limit the extent to which the fastener may urge the compression insert toward the base to prevent overcompression of a core of the fiber optic cable that may extend between the recesses of the base and the compression insert, wherein the shoulders of the base and the compression insert apply a compression force on the longitudinal strength members of the fiber optic cable while the shoulders of the base and the compression insert prevent overcompression of the fiber core of the fiber optic cable.

10. The grounding clamp of claim 9, further comprising an electrically conductive rod and the base including a rod opening generally parallel the recess through which the rod may extend.

11. The grounding clamp of claim 9, wherein the recess of the base is threaded.

12. The grounding clamp of claim 10, wherein the rod opening of the base is threaded and the rod is threadably engageable with the opening.

* * * * *

UNITED STATES PATENT AND TRADEMARK OFFICE
CERTIFICATE OF CORRECTION

| | | |
|---|---|---|
| PATENT NO. | : 8,023,793 B2 | Page 1 of 1 |
| APPLICATION NO. | : 12/369126 | |
| DATED | : September 20, 2011 | |
| INVENTOR(S) | : Kowalczyk et al. | |

It is certified that error appears in the above-identified patent and that said Letters Patent is hereby corrected as shown below:

Front page, insert below (*) Notice: --This patent is subject to a terminal disclaimer.--

Signed and Sealed this
Tenth Day of July, 2012

David J. Kappos
*Director of the United States Patent and Trademark Office*